Dec. 4, 1934.　　　F. K. SIMONS　　　1,983,007
COUPLING DEVICE
Filed Oct. 25, 1932
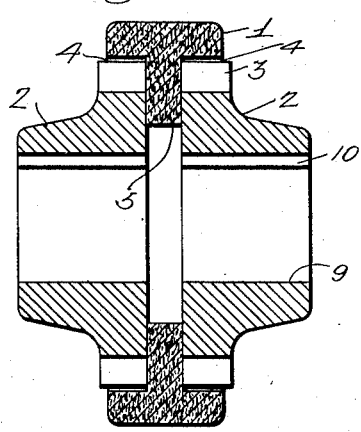
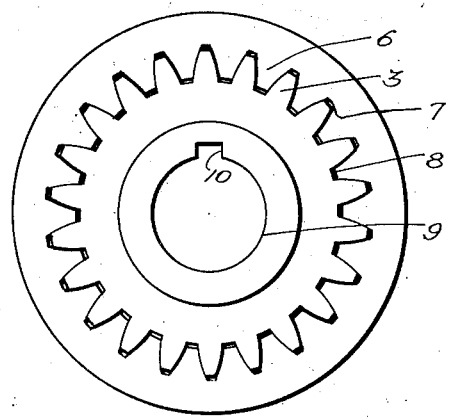
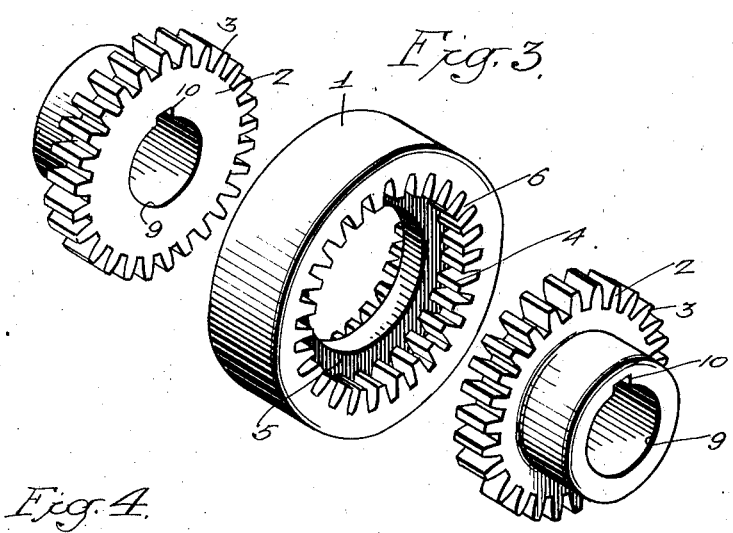
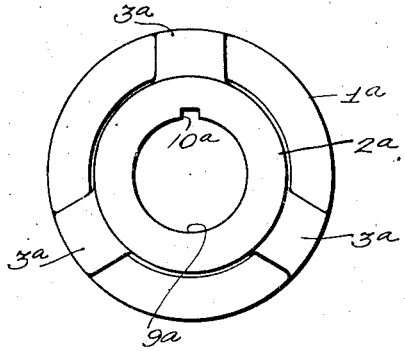
Inventor:
Frank K. Simons
by his Attorneys
Howson & Howson Patented Dec. 4, 1934

1,983,007

UNITED STATES PATENT OFFICE 1,983,007

COUPLING DEVICE

Frank K. Simons, St. Davids, Pa., assignor to Continental-Diamond Fibre Company, Newark, Del., a corporation of Delaware Application October 25, 1932, Serial No. 639,525

3 Claims. (Cl. 64—92)

This invention relates to coupling devices and has for its principal object the provision of a simple, strong, durable and efficient shaft coupling which may be manufactured commercially at low cost.

Another object of the invention is to provide a simple coupling composed of few parts but having a relatively high degree of flexibility which renders the device particularly adaptable for use in instances where the coupled shafts are misaligned or tend to become so.

A further object of the invention is to provide a coupling having a relatively high degree of flexibility but which is durable and has long life.

A still further object of the invention is to provide a simple flexible coupling having no metal to metal contact and, therefore, being free of objectionable clattering noise which is inherent in many prior couplings.

These and other objects, as well as numerous advantages of the device, will be more specifically set forth hereinafter. Reference is now made to the accompanying drawing, in which Fig. 1 is a sectional view of the preferred form of the device;

Fig. 2 is a face view of the device;

Fig. 3 is an isometric exploded view showing clearly the component parts of the device; and Fig. 4 is a face view of a modified form of the device.

Referring particularly to Figs. 1 to 3 of the drawing, there is shown a coupling device constructed in accordance with the teachings of the invention, which device comprises a non-metallic annular member 1 and a pair of similar metallic members 2. The metallic parts or members may be formed of any suitable metal or other rigid material having the necessary strength and durability. The non-metallic annular member may be formed of any suitable material having the desired strength but is preferably formed of fibrous material and an associated binder. Preferably, member 1 is formed of small irregular pieces of fibrous material, such as paper, cloth, and the like, impregnated with synthetic resin of the phenolic type and known in the art as mascerated resin-impregnated fibrous material. The phenolic resins, as is well known, exist in either of two stages, viz., an initial stage and a final stage. In its final stage, it is hard, infusible, and insoluble in water, oil, and the usual organic solvents. The fibrous material may be impregnated with the resin in its initial stage in which it is both fusible and soluble in accordance with any of the known methods either in sheet form, in which case the sheet material is cut to the desired size, or in the form of small irregular pieces. The resin-impregnated scrap material resulting from the manufacture of other articles is especially applicable for use. The resin-impregnated mass may then be molded under heat and pressure to form the desired part of the coupling device and to convert the resin from its initial stage to its final, infusible, insoluble stage.

Although it is preferred to form the non-metallic part of the specific materials above set forth, it is to be understood that the invention is not thus limited. The fibrous material may take the form of laminations or any other suitable form. Moreover, any thermo-setting binder may be associated with the fibrous material.

The metallic members 2 are similarly formed and each is provided with external teeth 3 which, in the present instance, extend entirely about the circumference of the part or member. The non-metallic member 1 is formed to provide recesses 4 and a centrally disposed, inwardly extending web 5. Recesses 4 are adapted to receive the toothed portions of member 2. The annular member 1 is formed to provide internal teeth 6 in recesses 4, which teeth may be molded therein and which are adapted to mesh with the teeth 3 of members 2, as clearly illustrated. It will be noted that the teeth of the associated members mesh snugly so that there is no appreciable lost rotary motion between the members. The members are so formed, however, that there are small spaces 7 and 8 at the ends of the teeth, which spaces allow slight transverse movement of the coupling members with respect to each other and thus impart flexibility to the device. Metallic members 2 are provided with central openings 9 for receiving the shafts to be coupled and keyways 10 are provided to permit secure locking of these members upon the respective shafts. When the members are cooperatively assembled, as illustrated, in association with the shafts to be coupled, the central web 5 of annular member 1 is disposed between the metallic members 2 and separates these members, preventing metal to metal contact. The annular member 1 is not attached to members 2 but is held in place between the two metallic members in a manner which will be clearly obvious.

By virtue of the resiliency of the non-metallic member 1 and the small spaces 7 and 8 above mentioned, the device has the desired degree of flexibility which is necessary in coupling devices, especially where the coupled shafts are slightly misaligned or have a tendency to become so. The non-metallic material is, however, very strong, rigid, and durable, its resiliency being appreciable only as compared with metal. The provision of teeth extending entirely about the device causes a uniform distribution of the stresses and, therefore, lessens the tendency of any particular part to wear excessively. The teeth may be formed on the non-metallic part with the same accuracy as a machined part but at a much lower cost. The number of teeth also gives great driving strength, especially for small diameter devices.

In Fig. 4, there is illustrated a modified form of coupling device which comprises a non-metallic annular member 1a and a pair of metallic members 2a, only one of which is visible in the illustration. Member 1a is formed entirely of non-metallic material such as above mentioned and preferably molded synthetic resin-impregnated fibrous pieces. Instead of having teeth extending entirely about the device, as in the preferred form, the metallic members 2a are each provided with three teeth 3a and the non-metallic member 1a is provided with recesses 11 which are adapted to snugly receive teeth 3a. The non-metallic member is recessed as before to receive the metallic members and teeth 3a extend through the radial recesses 11 to the peripheral surface of the device.

This form of the device has many of the advantages of the preferred form, especially the desired flexibility and requisite strength. In this case, however, the stresses are not uniformly distributed and the device is not as strong as the preferred form, nor is it intended to be, it being understood that this form of the device will be used in instances where great strength is not required. It will also be understood, of course, that the number of teeth 3a is not limited to the number shown but any desired number of teeth may be provided.

Regarding the device of the invention generally, and especially the preferred form of the device, there are numerous advantages attending the construction herein contemplated. The combination of resin-impregnated fibrous material and metal makes a very good bearing and at the same time provides a flexible device which will compensate for misalignment of the coupled shafts as above noted. The use of non-metallic material to form one of the coupling parts also eliminates the clatter or noise that is very noticeable in coupling devices having metallic parts in contact. Another advantage of the device is that it may be made at low cost as compared with any other prior couplings having the same driving power. Another advantage of the device is the lightness in weight due to the use of the fibrous material which is lighter in weight than metal.

A coupling formed in accordance with the invention is very durable and will resist the deleterious effects of water, acids, oils, etc. Such a coupling will also withstand high temperatures. It has been found that temperatures at least as high as 290° F. will be satisfactorily withstood.

The coupling, and especially the non-metallic part, has a relatively long life. In fact, during actual use of such a coupling, the non-metallic part has outworn the metallic part.

The device is, of course, applicable in any instance where it is desired to connect two units. It may be run dry or in water or any form of lubricant, as the particular instance requires. Another important advantage of the device is that, due to the insulating character of the non-metallic material, it may be used in instances where the flow of electric currents from one unit or shaft to another is encountered.

Although two forms of the device have been illustrated herein for the purpose of disclosure, it will be understood that the invention will not be limited to these forms but may be practiced in other modified forms. Such changes and modifications, therefore, as come within the scope of the appended claims are to be deemed a part of the invention.

The invention in this case is in the nature of a specific embodiment of the invention generically disclosed and claimed in co-pending application, Serial No. 639,526 filed even date herewith, and including a recessed non-metallic member and a metallic member extending into the same.

I claim:

1. A three-part coupling, comprising solely a non-metallic part and two metallic parts adapted for direct attachment to power transmitting shafts, said non-metallic part comprising a unitary rigid body having opposed separated sockets for snugly receiving the metallic parts, the sockets having peripheral walls of dentate formation, and the metallic parts having peripheral dentated portions adapted for interdentate association with the said socket walls.

2. A three-part coupling, comprising solely a non-metallic part and two metallic parts adapted for direct attachment to power transmitting shafts, said non-metallic part comprising a unitary rigid body composed of small fibrous pieces and an associated binder having opposed separated sockets for snugly receiving the metallic parts, the sockets having peripheral walls of dentate formation, and the metallic parts having peripheral dentated portions adapted for interdentate association with the said socket walls.

3. A three-part coupling, comprising solely a non-metallic part and two metallic parts adapted for direct attachment to power transmitting shafts, said non-metallic part comprising a unitary rigid body having opposed sockets separated by an inwardly extending web for snugly receiving the metallic parts and preventing contact therebetween, the sockets having peripheral walls of dentate formation, and the metallic parts having peripheral dentated portions adapted for interdentate association with the said socket walls.

FRANK K. SIMONS.